United States Patent [19]

Sumka et al.

[11] 4,276,500
[45] Jun. 30, 1981

[54] BRAKING SYSTEM

[75] Inventors: Elmer H. Sumka, Edison; Henry J. Shea, Dover, both of N.J.

[73] Assignee: Westinghouse Electric Corp., Pittsburgh, Pa.

[21] Appl. No.: 24,767

[22] Filed: Mar. 28, 1979

[51] Int. Cl.³ .......................................... H02K 17/32
[52] U.S. Cl. .................................. 318/369; 318/366; 318/367; 318/365; 318/362
[58] Field of Search ............... 318/366, 367, 365, 364, 318/369, 757, 362, 372; 198/854, 855

[56] References Cited

U.S. PATENT DOCUMENTS

| | | | |
|---|---|---|---|
| 1,166,679 | 1/1916 | Handy | 198/856 |
| 2,460,017 | 1/1949 | Lautrup et al. | 188/69 |
| 3,209,225 | 9/1965 | Choudhury | 318/369 |
| 3,457,403 | 7/1969 | Smith, Jr. | 246/187 R |
| 3,866,725 | 2/1975 | Greutter | 188/134 |
| 3,896,925 | 7/1975 | Mitsui et al. | 198/854 |
| 3,927,738 | 12/1975 | Ernst | 188/187 |
| 4,139,810 | 2/1979 | Ueki et al. | 318/372 |

FOREIGN PATENT DOCUMENTS 2003951 8/1971 Fed. Rep. of Germany .
2123851 12/1971 Fed. Rep. of Germany .
438626 12/1967 Switzerland .

Primary Examiner—Ulysses Weldon
Attorney, Agent, or Firm—D. R. Lackey

[57] ABSTRACT

A braking system for transportation apparatus, such as an escalator, having an electrical drive. The braking effort applied when the transportation apparatus is to be stopped is inversely proportional to the electrical energy being consumed by the electrical drive at the time the stopping decision is made.

6 Claims, 5 Drawing Figures

BRAKING SYSTEM

BACKGROUND OF THE INVENTION

1. Field of the Invention

The invention relates in general to braking systems, and more specifically to controllable braking systems for transportation apparatus which transports passengers between spaced landings.

2. Description of the Prior Art

Escalators are provided with an electrically released, mechanically applied brake capable of stopping an up or down traveling escalator with any load up to brake design load.

The maximum braking effort is required to stop a fully loaded escalator going down, and thus the brake is sized accordingly. For example, the brake torque is selected to provide some minimum value of deceleration, such as about 1 or 2 ft/sec$^2$, when an escalator with rated load is stopped while transporting passengers from an upper landing to a lower landing. Thus, any other condition than a fully loaded escalator going down will result in a higher rate of deceleration. The highest rate of deceleration would occur when a fully loaded escalator is braked to a stop while transporting passengers from the lower landing to the upper landing. This may be about 8 to 10 ft/sec$^2$, for a typical escalator with a fixed braking torque. The prior art has disclosed many different arrangements which adjust the braking effort, in order to decrease the range between the minimum and maximum rates of deceleration which may occur, by taking such things as speed, load, and/or travel direction into account. For example, the braking effort may be adjusted according to speed, such as in response to an error signal which is responsive to the difference between the actual speed and the desired speed of the escalator while braking to a stop.

The braking effort may be adjusted according to travel direction. When the escalator is started in a predetermined travel direction, the control automatically selects a braking effort associated with this selected travel direction.

The braking effort may be adjusted according to passenger load on the escalator. Certain prior art arrangements sense passenger load via mechanical arrangements which sense speed or deceleration during braking, and make mechanical adjustments which adjust the braking effort accordingly. Still another prior art arrangement senses load by sensing the tensile stress in the drive chain.

A speed feedback system during braking which electrically or mechanically adjusts braking effort in response to deceleration is very costly. A system which brakes in response to travel direction may have wide variations from no load to full load. A system which brakes in response to passenger load sensed by stress in the conveyor drive chain only gives an accurate signal when the travel direction is also factored into the adjustment.

SUMMARY OF THE INVENTION

Briefly, the present invention is a new and improved braking system for transportation apparatus of the type which includes an inclined conveyor and one or more electrical drives for the conveyor. A predetermined parameter of an electrical drive is monitored, with the predetermined parameter being related to the effort expended, i.e., energy consumed, by the electrical drive. At least one control signal is provided in response to the monitored parameter, such that the at least one control signal is responsive to the effort being expended by the electrical drive at the time braking is called for. This at least one control signal persists for the period of time necessary to stop the transportation apparatus, notwithstanding disconnection of the electrical drive at the start of the braking operation. The braking effort is selected in response to the at least one control signal such that the selected braking effort is inversely proportional to the effort being expended by the electrical drive just prior to the disconnection of the electrical drive and the start of braking.

BRIEF DESCRIPTION OF THE DRAWINGS

The invention may be better understood and further advantages and uses thereof more readily apparent, when considered in view of the following detailed description of exemplary embodiments, taken with the accompanying drawings in which.

DESCRIPTION OF PREFERRED EMBODIMENTS

Figure 1:
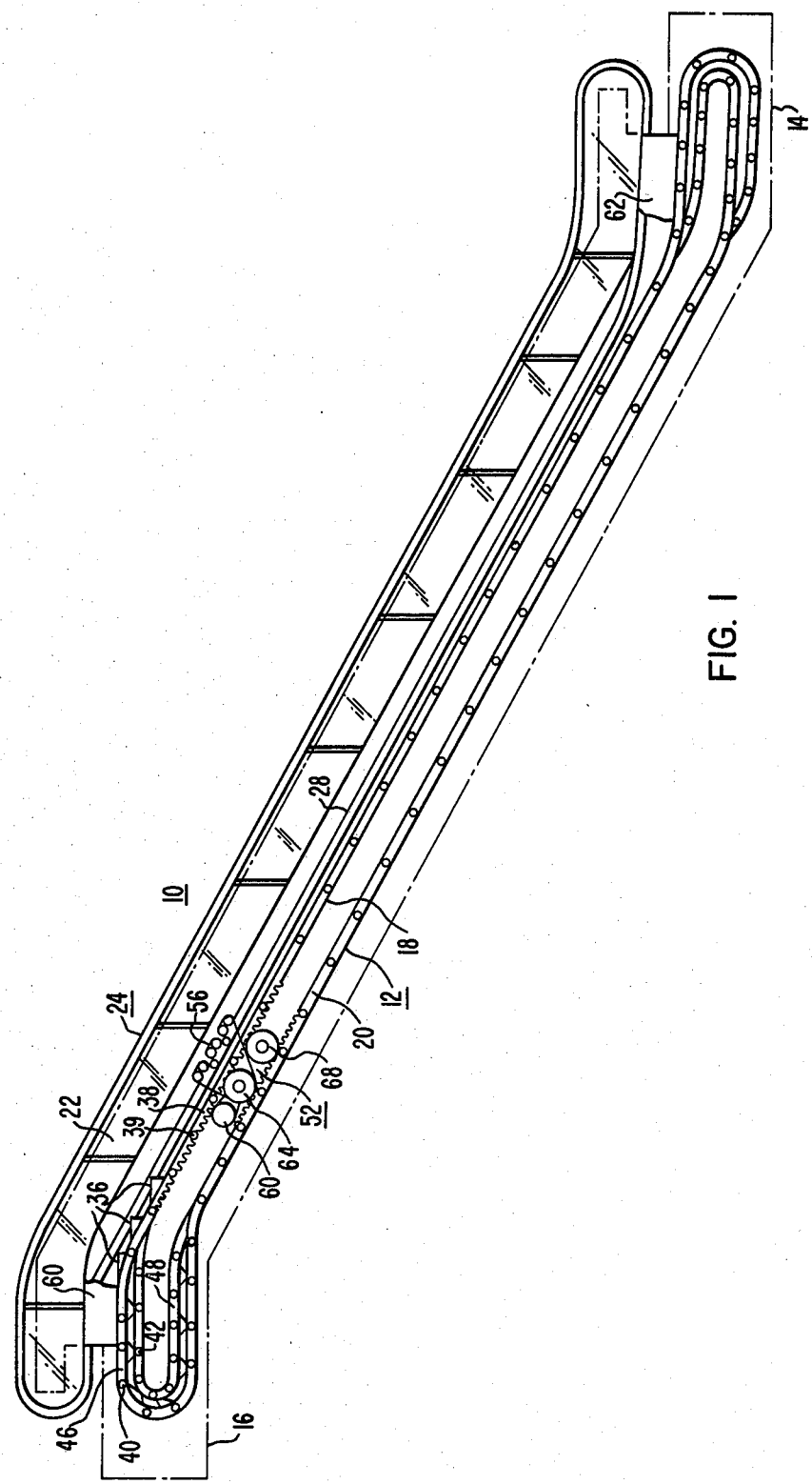
FIG. 1 is an elevational view of an escalator which may be constructed according to the teachings of the invention.

Referring now to the drawings, and to FIG. 1 in particular, there is shown an escalator 10 of the type which may utilize the teachings of the invention. Escalator 10 employs a conveyor or endless belt 12 for transporting passengers between a first or lower landing 14 and a second or upper landing 16. The conveyor 12 is of the endless type, having an upper load bearing run 18 on which passengers stand while being transported between the landings, and a lower return run 20.

A balustrade 22 is disposed above the conveyor 12 for guiding a continuous flexible handrail 24. The balustrade guides the handrail 24 as it moves about a closed loop.

Conveyor 12 includes a plurality of steps 36, only a few of which are shown in FIG. 1. The steps are each clamped to a step axle, and they move in a closed path, with the conveyor 12 being driven in a conventional manner, such as illustrated in U.S. Pat. No. 3,414,109, or the conveyor 12 may be driven by a modular drive arrangement, which includes one or more modular drive units in the truss, as disclosed in U.S. Pat. No. 3,677,388, both of which are assigned to the same assignee as the present application. For purposes of example, the modular drive arrangement is shown in FIG. 1.

As disclosed in U.S. Pat. No. 3,677,388, the conveyor or endless belt 12 has first and second sides, with each side being formed of a plurality of toothed links 38, interconnected by the step axles to which the steps 36 are connected. The steps 36 are supported by main and trailer rollers 40 and 42, respectively, disposed at opposite sides of the endless belt 12. The main and trailer rollers cooperate with main and trailer tracks 46 and 48, respectively, to guide the steps 36 in the endless path or loop and cause articulation of the steps between platform and step modes at the proper locations. The steps are driven by one or more modular drive units, such as modular drive unit 52. The modular drive unit 52 includes sprocket wheels and a drive chain for engaging the toothed links 38. The modular drive unit 52 includes a handrail drive pulley on each side of the conveyor which drives a handrail drive unit 56.

Figure 3:
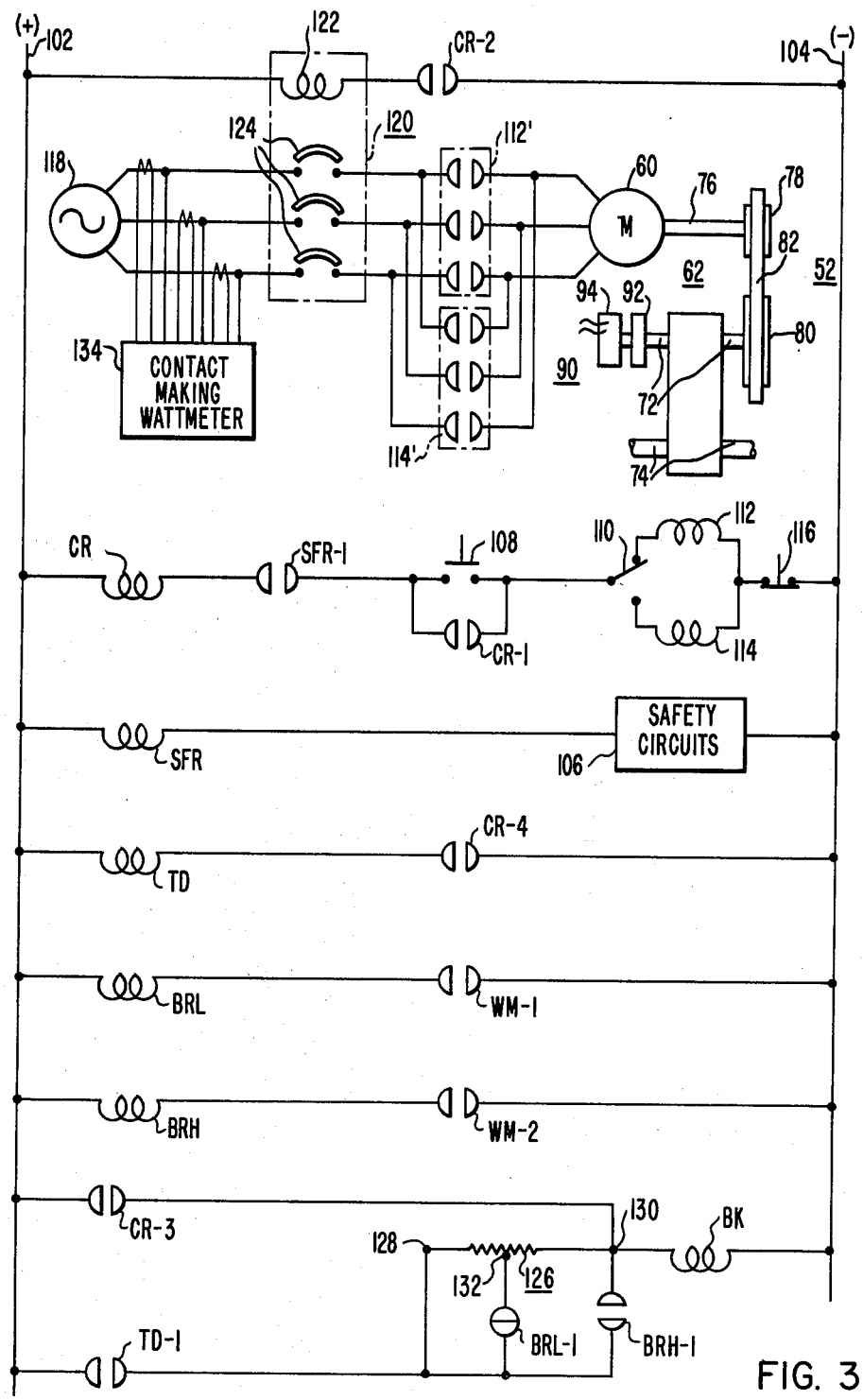
FIG. 3 is a schematic diagram of a braking system constructed according to a first embodiment of the invention.

In general, as shown in FIGS. 1 and 3, drive unit 52 includes an electrical drive motor 60, such as a three-phase, 60 Hz. induction motor, a gear reducer 62, a pair of spaced, driven sprocket wheels, such as sprocket wheel 64, and a pair of spaced idler sprocket wheels, such as sprocket wheels 68. The gear reducer 62, which may be a commercial 36.2:1 gear reducer, has an input shaft 72 and an output shaft 74. The drive motor 60 has a motor shaft 76. The motor shaft 76 is coupled to the input shaft 72 of the gear reducer 62 by any suitable means, such as pulleys 78 and 80 and a timing belt 82.

The output shaft 74 of gear reducer 62 is connected to the spaced pair of drive sprockets, and each driven sprocket is coupled with an idler sprocket via a drive chain. The drive chain, for example, may have three strands, with the outer two strands engaging teeth on the sprockets, and with the inner strand engaging the teeth on the toothed links 38, to drive the endless belt 12 about its guided loop.

A fail-safe friction brake 90, which is electrically released and mechanically applied, is mounted on the input shaft 72 of the gear reducer 62. Brake 90 may be of any suitable type, such as the caliper brake illustrated in the hereinbefore-mentioned U.S. Pat. No. 3,677,388, or the plate-type brake illustrated in FIG. 3. In the plate type, a first plate member 92 rotates with shaft 72, and a second plate member 94, which is non-rotatable, is pulled back away from the rotatable plate 92 electrically, against a pressure from a spring or permanent magnet. If the electrical power connected to the brake is disconnected, the brake sets due to the pressure from the spring or permanent magnet, and is thus "fail-safe".

While the fail-safe function and the controlled braking torque function of the invention are preferably provided by a single brake, such as just described, it is to be understood that these functions may be provided by two separate brakes. For example, an electrically applied brake may be used to provide the desired braking torque because of ease in selecting the torque, and a separate fail-safe brake may be used to brake the escalator due to power failure.

As hereinbefore stated, if the braking effort of the electrically released, mechanically applied brake is uncontrolled, the deceleration and jerk rates will vary over a relatively large range, depending upon travel direction and passenger load. We have found a control parameter which may be used to select the braking effort, which automatically takes into account travel direction and passenger load, correctly selecting an appropriate braking effort without separately factoring into the effort decision passenger load and travel direction. This parameter is related to the electrical energy being expended or used by the electrical drive unit 52 at the time braking is called for. Thus, the electrical current and power factor may be measured, or more conveniently, electrical power in KW may be directly measured, with these measurements being used to provide one or more control signals for selecting the braking effort.

Figure 2:
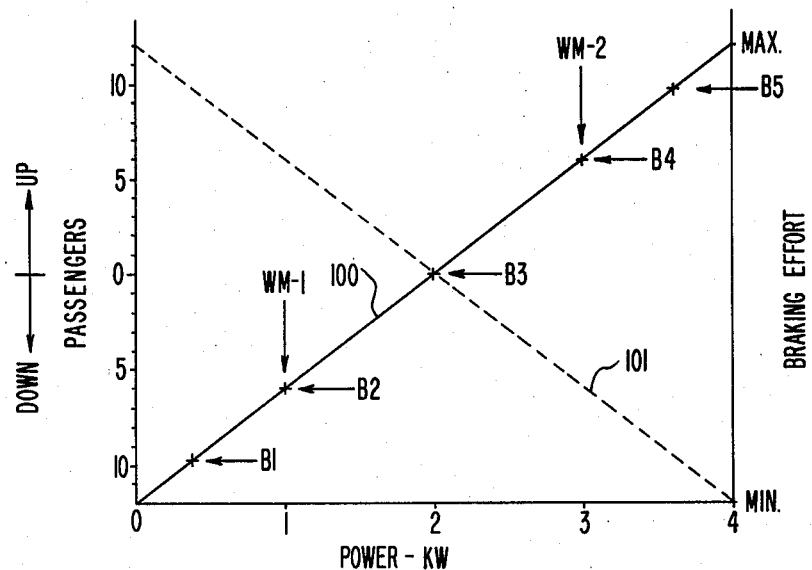
FIG. 2 is a graph which illustrates typical drive power versus passenger loading and direction for an escalator.

FIG. 2 is a graph which plots travel direction and passenger load against electrical power usage of a drive unit. As illustrated in FIG. 2, the electrical power usage by an unloaded escalator is about the same for either travel direction, for example around 2 KW for a modular drive unit such as disclosed in U.S. Pat. No. 3,677,388. When an up traveling escalator is loaded, the electrical power usage increases with increasing passenger load. When a down traveling escalator is loaded, the electrical power usage decreases with increasing passenger load, and may become regenerative. This defines a curve 100 which starts at a minimum for a loaded escalator traveling in the down direction, and it increases substantially linearly as passenger load is decreased. Curve 100 continues to increase substantially linearly as the downwardly traveling escalator reaches no-load, the direction is changed to the up direction, and the upwardly traveling escalator is gradually loaded with passengers. On the other hand, broken curve 101 indicates the braking effort versus electrical power usage, with the braking effort being inversely proportional to electrical power usage.

FIG. 3 is a schematic diagram of a braking system constructed according to a first embodiment of the invention. A safety relay SFR is connected between electrical conductors 102 and 104 via a string of safety contacts, shown generally as safety circuits 106. Electrical conductors 102 and 104 are connected to a source of electrical potential. The safety circuits may include contacts from broken belt switches, switches responsive to broken step links 38, skirt safety switches, step upthrust switches, broken drive chain switches, under-/overspeed switch, maintenance switches, and the like.

If the safety circuits 106 indicate there is no malfunction in the system, relay SFR is energized and it closes a contact SFR-1 in the circuit of a control relay CR. A start push button 108 completes a series circuit between conductors 102 and 104 which also includes the electromagnetic coil of a control relay CR, a direction control arrangement including a selector switch 110 which selects either the up or down direction direction relays 112 and 114, respectively, a stop push button 116, and the n.o. contact SFR-1 of safety relay SFR. A seal-in contact CR-1 of relay CR is serially connected across the start push button 108.

Drive motor 60 is connected to a source 118 of electrical potential via the contacts 124 of an electrical contactor 120, and via either the up or down direction selection contacts 112' and 114', of up and down direction relays 112 and 114, respectively. Contactor 120 includes an operating coil 122 connected between conductors 102 and 104 via a n.o. contact CR-2 of the control relay CR.

A brake coil BK of brake 90 is connected between conductors 102 and 104 via a first circuit which includes a n.o. contact CR-3 of control relay CR, and via a second circuit which selects the braking effort to be applied by brake 90 when the escalator is to be stopped. The second circuit includes a tapped resistor 126 having first and second ends 128 and 130, respectively, and a tap 132. The second circuit also includes a plurality of contacts of relays TD, BRL and BRH. These relays have a time delayed drop out. The time delay is determined by the maximum design stopping time of the braking system. For example, if the minimum deceleraon rate for a loaded escalator traveling down is designed to be 2 ft/sec$^2$, and if the normal speed of the escalator is 90 FPM (1.5 FPS), the escalator will stop in .75 second. The time delay is then selected to be slightly longer than the maximum stopping time. For example, one second would be suitable for this example.

Relay TD is connected between conductors 102 and 104 via a n.o. contact CR-4 of control relay CR. Relay TD includes a n.o. contact TD-1 in the circuit of brake coil BK.

Relay BRL is connected between conductors 102 and 104 via a contact WM-1 of a contact making wattmeter 134. Wattmeter 134 is connected to the electrical conductors which interconnect the source 118 with the drive motor 60, such that wattmeter 134 indicates the instantaneous electrical power usage by the drive motor 60. Relay BRL includes a n.c. contact BRL-1 in the circuit of the brake coil BK.

Relay BRH is connected between conductors 102 and 104 via a contact WM-2 of the contact making wattmeter 134. Relay BRH includes a n.o. contact BRH-1 in the circuit of the brake coil BK.

As hereinbefore stated, the contact making wattmeter 134 is connected to measure the electrical power being used by the drive motor 60 at any instant. Contacts WM-1 and WM-2, for example, may be arranged to both be open when the escalator is unloaded, or when the passenger load is light, in either travel direction. If the escalator, while traveling in the downward direction, exceeds a predetermined passenger load, the electrical power consumed will drop below a predetermined KW consumption by the drive motor 60, and contact WM-1 is arranged to close when the KW consumption drops below this selected predetermined level, and of course it will open again when the KW consumption rises above this preselected level. A slight hysteresis prevents "teasing". On the other hand, if the escalator is traveling in the upward direction and it exceeds a predetermined passenger load, the electrical power consumed by drive motor 60 will increase beyond a predetermined KW consumption, and contact WM-2 is arranged to close when this preselected KW consumption is exceeded, and of course it will reopen again when the KW usage drops below this level, again with a slight hysteresis.

Figure 4:
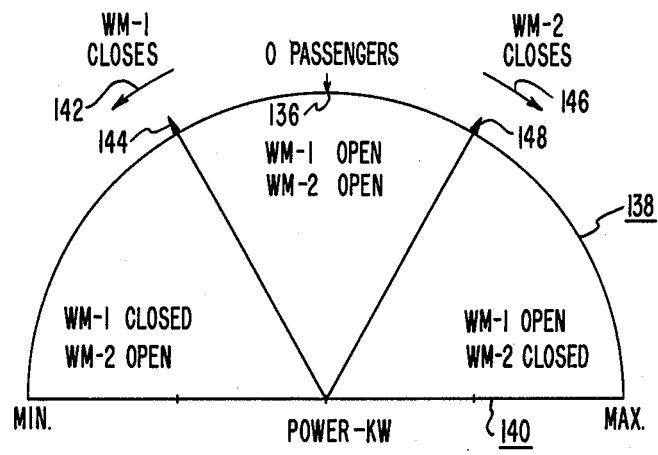
FIG. 4 is a graph which illustrates a contact sequence which may be used for the braking system shown in FIG. 3.

FIG. 4 is a graphical representation of the operation of contacts WM-1 and WM-2. Point 136 on half-circle 138 indicates power usage for no passenger load, for either travel direction. Power usage is indicated by projecting points on circle 138 vertically downward to horizontal line 140. With no load on the escalator, in either travel direction, both contacts WM-1 and WM-2 are open. Increased passenger loading while the escalator is traveling in the downward direction is indicated by arrow 142. When the passenger load increases to the point where power consumption drops below pointer 144, contact WM-1 closes. Contact WM-2 is unaffected, and will still be in the open condition.

Increased passenger loading when the escalator is traveling in the upward direction, is indicated by arrow 146. When the passenger load increases to the point where power consumption increases beyond pointer 148, contact WM-2 closes. Contact WM-1 will be unaffected, and will still be in its open condition. Typical operating points for contacts WM-1 and WM-2 are also indicated on curve 100 in FIG. 2.

With this specific arrangement and operation of contacts WM-1 and WM-2, the n.o. contact TD-1 may be connected between conductor 102 and the first end 128 of resistor 126. Brake coil BK may be connected from the second end 130 of resistor 126 to conductor 104. The n.o. contact BRH-1 may be connected across resistor 126, i.e., to the first and second ends 128 and 130, respectively of resistor 126. Thus, when contact BRH-1 is closed, resistor 126 is effectively taken out of the circuit of brake coil BK. The n.c. contact BRL-1 may be connected from tap 132 to the first end 128 of resistor 126, shorting out a portion of resistor 126 when it is closed.

The operation of the braking system shown in FIG. 3 will now be described. When contacts WM-1 and WM-2 are both open, indicating an unloaded escalator in either travel direction, or a light passenger load on the escalator in either travel direction, the contacts in the circuit of brake coil BK will be as shown in FIG. 3. If the escalator is stopped while the contacts are in this condition, as intermediate braking effort will be applied, as the current through coil BK will be between the maximum current, i.e., minimum braking effort, and zero current, i.e., maximum braking effort. The delay in drop out of relay TD will "memorize" the electrical power usage as it existed at the start of the braking sequence, and it will retain this indication for the selected period of the time delay, notwithstanding a drop to zero in power usage at the start of braking, since the drive motor is disconnected from source 118. When contact TD-1 opens at the end of the preselected time period, the escalator should already have been braked to a stop. The opening of contact TD-1 breaks the metallic circuit for brake coil BK between conductors 102 and 104, and it causes the brake 90 to apply maximum braking effort.

If the escalator is traveling in the downward direction, and the passenger load increases sufficiently to decrease the KW usage of the drive motor 60 to the point where contact WM-1 closes, relay BRL will pick up and contact BRL-1 thus opens. If the escalator is stopped while contact BRL-1 is open, the entire resistor 126 will be in the braking circuit, as contact BRH-1 will also be open, reducing the current through the brake coil BK to the minimum controlled value and causing brake 90 to apply the maximum braking effort of the controlled braking range. The delay in drop out of relays TD and BRL preserve the selected braking effort for a time period sufficient to insure that the escalator has stopped. Relays TD and BRL then drop out and the electrical circuit through coil BK is broken to cause the brake 90 to apply maximum braking effort.

If the escalator is traveling in the upward direction and the passenger increases sufficiently to increase the KW usage of drive motor 60 to the point where contact WM-2 closes, relay BRH will pick up and contact BRH-1 closes to effectively remove resistor 126 from the braking circuit. Brake 90 will thus apply the minimum braking effort of the controlled braking range. A loaded escalator traveling in the upward direction will stop relatively quickly without any auxiliary braking effort on the part of brake 90. When relays BRH and TD drop out after the predetermined short time delay, the brake 90 will then apply maximum braking effort, preventing reversal of the stairway.

It is to be understood that the specific connection points on resistor 126 are shown for purposes of example, as the design range for deceleration, and inertia of the escalator will determine how much resistance should be in the circuit of the brake coil BK for the various combinations of open and closed contacts WM-1 and WM-2.

For a modular drive system which utilizes more than one modular drive unit, the power usage need only be monitored for one of the drive units. Relays TD, BRL and BRH would have similar contacts in the circuits of the brake coils of the other drive units.

Figure 5:
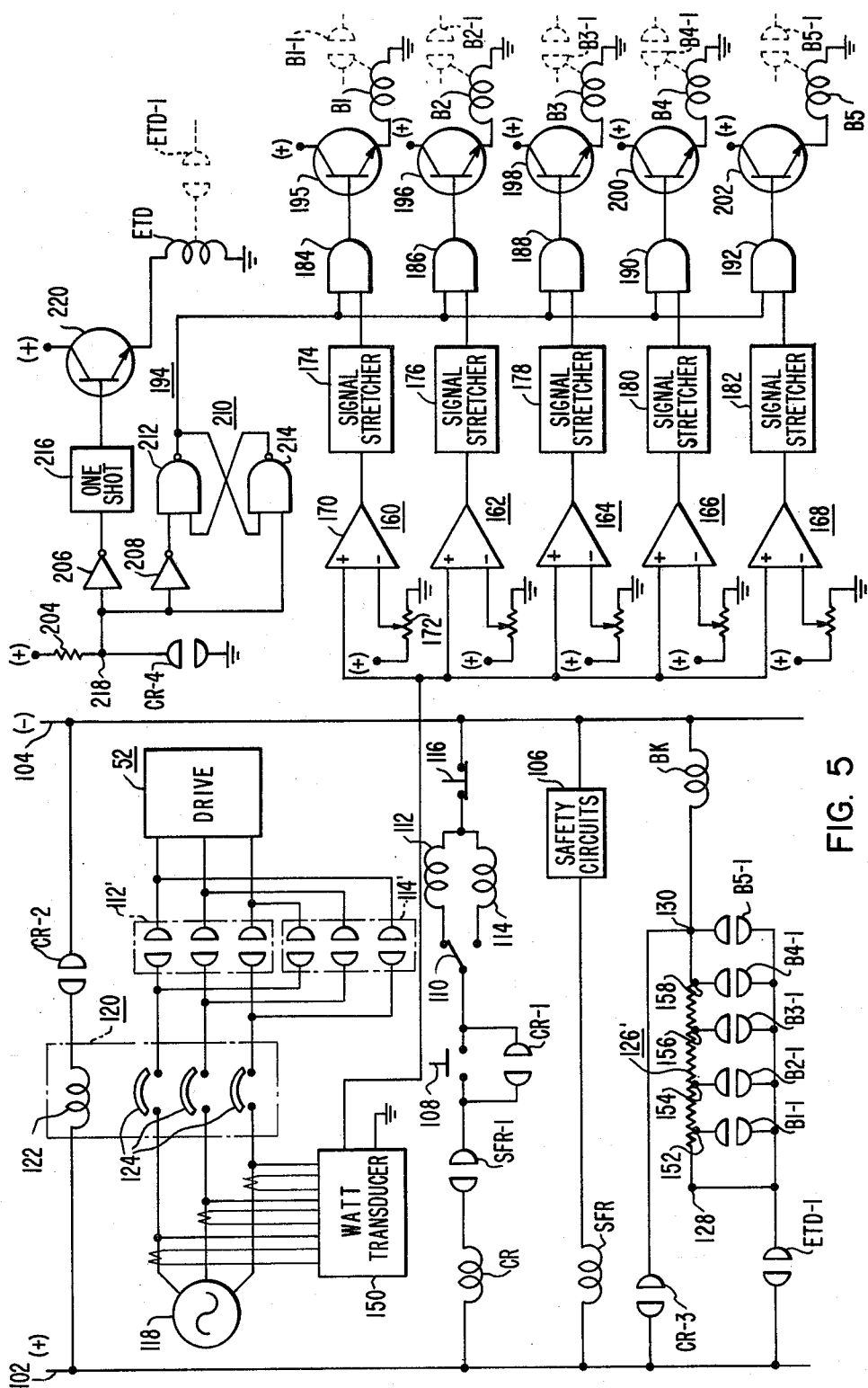
FIG. 5 is a schematic diagram of a braking system constructed according to another embodiment of the invention.

FIG. 5 is a schematic diagram which illustrates another embodiment of the invention. The relatively low cost of solid-state circuitry makes it economically feasible to add many additional taps to resistor 126, and thus provide a narrower controlled range of deceleration. FIG. 5 illustrates such a solid-state embodiment.

The contact making wattmeter 134 of the FIG. 3 embodiment has been replaced by a watt transducer 150. Watt transducer 150 provides a D.C. signal proportional to the electrical power usage of the drive motor 60.

Resistor 126 has been modified to include taps 152, 154, 156 and 158, and thus resistor 126 is now referred to as resistor 126', in order to indicate that it has been modified.

The contact making function of wattmeter 134 has been replaced by a plurality of level detectors 160, 162, 164, 166 and 168. For example, each level detector, such as level detector 160, may include an operational amplifier 170. Its non-inverting input is connected to the output of the watt transducer 150. Its inverting input is connected to a reference voltage, which may be provided by an adjustable resistor 172 connected between a source of positive unidirectional potential and ground. The inverting input of the operational amplifier would be connected to the selector arm of the adjustable resistor 172. The reference voltages of the plurality of level detectors are set to operate at increasing levels of the D.C. signal provided by the watt transducer 150. When the level detector indicates that the D.C. output signal from watt transducer 150 has reached the setting of its reference voltage, its output switches from logic zero to logic one to trigger a signal stretcher, such as signal stretchers 174, 176, 178, 180 and 182. As long as the output of its associated level detector is high, or at the logic one level, the output of the signal stretcher is also at the logic one level. The signal stretchers are selected to have a delayed drop following removal of the logic one from their input terminals, with the delay being selected to be the same as the delayed drops described relative to relays TD, BRL and BRH of the FIG. 3 embodiment. For example, a suitable signal stretcher may be provided by inverting the output of the level detector, and applying this inverted output to the set input of a flip-flop formed of cross-coupled NAND gates. The reset input of the flip-flop is connected to the output of the level detector via a one-shot or monostable. Thus, the output of the flip-flop will go high when the output of the level detector goes high. The output will go low after the output of the level detector goes low, with a time delay equal to the pulse time of the one-shot. This delay "memorizes" the level of the watt transducer signal and the time braking is called for, in order to permit the selected braking effort to persist until the escalator stops, notwithstanding the D.C. output signal from the watt transducer 150 dropping to zero when the electrical drive motor is removed or disconnected from the source 118.

The outputs of the signal stretchers are each applied to an input of a dual input AND gate. For example, the outputs of signal stretchers 174, 176, 178, 180 and 182 are applied to inputs of AND gates 184, 186, 188, 190 and 192, respectively. The remaining input of each of the AND gates is connected to a master time delay and enable circuit 194. Circuit 194 maintains the solid-state aspect of the embodiment until braking is actually called for, preventing the operation of a plurality of transistors and electromechanical relays until the braking sequence actually starts. For example, the output of each of the AND gates is connected to the base electrode of an NPN transistor, such as transistors 195, 196, 198, 200 and 202. The collector electrodes of these transistors are connected to a source of unidirectional potential, and their emitters are each connected to the operating coil of an electromechanical relay such as relays B1, B2, B3, B4 and B5. Each of these electromechanical relays has a n.o. contact in the circuit of brake coil BK.

The master time delay and enable circuit 194 includes a n.o. contact CR-4 of control relay CR, a resistor 204, inverters 206 and 208, a flip-flop 210, which may be formed of cross-coupled NAND gates 212 and 214, a one-shot or mono 216, a transistor 220 and a relay ETD having a n.o. contact ETD-1 connected between conductor 102 and the first end 128 of resistor 126'. Mono 216 is connected to be triggered by a negative going edge. The pulse duration of the mono is long enough to cover the maximum braking time. The n.o. contacts of relays B1, B2, B3, B4 and B5 are connected to taps 152, 154, 156, 158, and the second end 130, respectively, of resistor 126'.

Resistor 204 is connected from a source of unidirectional potential to ground via n.o. contact CR4. The junction 218 between resistor 204 and contact CR-4 is connected to the input of inverter 206, the output of inverter 206 is connected to the input of mono 216, the output of mono 216 is connected to the base electrode of transistor 220, and the emitter electrode of transistor 220 is connected to the operating coil of relay ETD. The collector of transistor 220 is connected to a source of unidirectional potential.

Junction 218 is also connected to an input of NAND gate 212 via inverter 208. Junction 218 is also connected directly to an input of NAND gate 214. The output of NAND gate 212, and thus the output of flip-flop 210, is connected to an input of each of the AND gates 184, 186, 188, 190 and 192.

When the control relay CR picks up at the time escalator is energized, contact CR-4 will close and junction 218 will be at the logic zero level. Thus, the output of flip-flop 210 which is applied to the AND gates is at the logic zero level, and the AND gates are blocked. Thus, while the escalator is operating, the blocked AND gates prevent operation of the transistors and the associated electromechanical relays. This prevents noise and wear of the electromechanical relays as the escalator is loaded and unloaded. When the escalator is operating, the output of mono 216 will be low, transistor 220 will be deenergized, relay ETD will be deenergized, and contact ETD-1 will be open.

When the escalator is to be braked to a stop for some reason, control relay CR will drop and its contact CR-4 will open. The negative going output of inverter 206 will trigger one-shot 216 and contact ETD-1 will close for the pulse duration of the one shot. Flip-flop 210 is also triggered to provide a logic one at its output which enables the AND gates 184, 186, 188, 190 and 192. The signal stretchers 174, 176, 178, 180 and 182 retain the indication of the level of the D.C. output signal from the watt transducer 150 for a predetermined period of time which is selected to enable the escalator to be braked to a stop with the selected braking effort. When the AND gates 184 are enabled at the start of the braking sequence, the signal stretchers which have a logic one output will cause the associated AND gates to provide a logic one output which turns on the associated transistor and operates the associated electromechanical relay. The higher the electrical power usage of drive motor 60, the more resistance which is effectively removed from resistor 126', and thus the less the braking effort.

One-shot 216 retains relay ETD in the energized condition for the braking period, and then it drops out at the end of the predetermined time delay to open its contact ETD-1 and break the metallic circuit through the brake coil BK. Brake 90 then applies maximum braking effort, after the escalator has stopped. It will be noted that if the portion of the circuit shown in FIG. 5 which adjusts the braking effort fails to tap out a portion of resistor 126' for some reason, that the maximum braking effort will be applied, which is the desired fail-safe mode.

Representative pickup points for relays B1, B2, B3, B4 and B5 are indicated on curve 100 of the power diagram shown in FIG. 2.

We claim as our invention:

1. A braking system for transportation apparatus, comprising:
    an inclined conveyor for transporting passengers between first and second landings,
    a source of electrical energy,
    electrical drive means for said conveyor,
    contactor means connecting said electrical drive means to said source of electrical energy,
    electrical measuring means providing a control signal responsive to a predetermined electrical parameter of said electrical drive means, with said parameter being related to the electrical energy being used by said electrical drive means to transport passengers between the landings,
    braking means for stopping said conveyor,
    and adjustment means for adjusting the braking effort of said braking means in response to said control signal, such that the braking effort is inversely proportional to the effort being expended by said drive means at the time said braking means is operated to stop the conveyor.

2. The braking system of claim 1 wherein the contactor means disconnects the electrical drive means from the source of energy when the braking means is operated to stop the conveyor, and wherein the adjustment means adjusts the braking effort of the braking means in response to the condition of the control signal as it existed just before the source of electrical energy is disconnected.

3. The braking system of claim 2 wherein the braking means includes a brake coil, and the adjustment means includes time delay means which maintains the selected brake adjustment for a predetermined period of time sufficient to stop the conveyor, via an electrical circuit which includes said brake coil, said time delay means opening the electrical circuit at the end of the predetermined period of time to apply maximum braking effort after the conveyor has stopped.

4. The braking system of claim 2 wherein the braking means includes a brake coil and a tapped resistor, and the adjustment means includes time delay means which maintains the selected brake adjustment for a predetermined period of time sufficient to stop the conveyor, via an electrical circuit which includes said brake coil and said tapped resistor, with the greater the energy being used by the drive means at the time the braking means is operated, the less the resistance of said resistor in the electrical circuit, and wherein said time delay means opens the electrical circuit at the end of the predetermined period of time to cause the braking means to apply maximum braking effort after the conveyor is stopped.

5. The braking system of claim 1 wherein the electrical measuring means measures the electrical power consumed by the electrical drive means.

6. A braking system for transportation apparatus, comprising:
    a conveyor for transporting passengers between first and second landings,
    a source of electrical energy,
    electrical drive means for said conveyor,
    contactor means connecting said electrical drive means to said source of electrical energy,
    braking means for said conveyor,
    control means for causing said contactor means to disconnect said source of electrical energy from said electrical drive means and for operating said braking means when said conveyor is to be stopped,
    adjustment means for selecting the braking effort of said braking means,
    and means responsive to the electrical power usage of said electrical drive means for causing said adjustment means to select a braking effort which is inversely proportional to the electrical power usage of said electrical drive means at the time said control means causes said contactor means to disconnect said source of electrical energy from said electrical drive means.

* * * * *